S. E. SEELY.
Sand-Bands for Vehicle-Axles.

No. 150,362. Patented April 28, 1874.

Witnesses.
H. C. Scott
C. L. Everts

Inventor.
Silas E. Seely
per G. J. Ferriss Atty's

UNITED STATES PATENT OFFICE.

SILAS E. SEELY, OF ROME, PENNSYLVANIA.

IMPROVEMENT IN SAND-BANDS FOR VEHICLE-AXLES.

Specification forming part of Letters Patent No. 150,362, dated April 28, 1874; application filed July 17, 1872.

*To all whom it may concern:*

Be it known that I, SILAS E. SEELY, of Rome, in the county of Bradford and State of Pennsylvania, have invented certain new and useful Improvements in Axles for Vehicles; and I do hereby declare the following to be a full, clear, and exact description thereof, reference being had to the accompanying drawings, and to the letters of reference marked thereon.

The nature of my invention consists in the construction and arrangement of a removable flange, to be attached on axles for vehicles at the inner end of the hub of the wheel, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
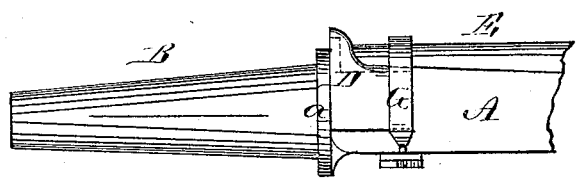
Figure 2:
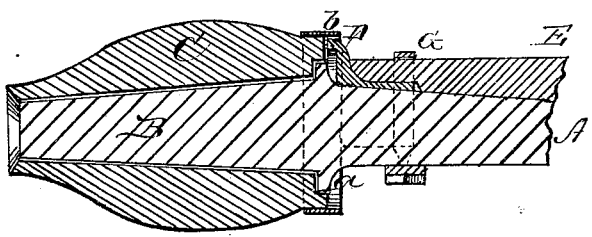

Figure 1 is a side view of an axle with my invention; and Fig. 2 is a longitudinal section of the same, showing the hub of the wheel in position on the spindle.

A represents the axle, with the spindle B and the circumferential collar *a*. C is the wheel-hub placed on the spindle B, and having a recess in its inner end, in which the collar *a* fits. On the upper side of the axle A is placed the flange D, constructed substantially as shown in the drawing, to fit over the axle and extend down the front and rear sides thereof for a suitable distance, or nearly to the lower edges of the axle. At the outer end the flange D is enlarged, and projects close up to the interior surface of the hub-band *b* on the inner end of the hub C. The flange D is held in place by a top bar, E, laid on the axle, and the end of which fits over the inner end of the flange at the top. An ordinary clip, G, is then passed around the axle, flange, and bar, as shown, fastening the parts firmly together. The flange is covered by the hub-band *b*, and no dirt or water can get over the top of the flange to the inside.

Having thus fully described my invention, what I claim as new, and desire to secure by Letters Patent, is—

1. The flange D, to fit over the axle and down the front and back thereof, in combination with the axle-collar *a* and hub C, with band *b*, all substantially as and for the purposes set forth.

2. The combination, with the axle A, having circumferential collar, and the recessed hub C, provided with the hub-band *b*, of the flange D, bar E, and clip G, all constructed substantially as and for the purpose set forth.

SILAS E. SEELY.

Witnesses:
   E. L. CHAFFEE,
   ORSON RICKEY.